(12) United States Patent
Yang

(10) Patent No.: US 8,224,175 B2
(45) Date of Patent: Jul. 17, 2012

(54) PHOTOGRAPHIC APPARATUS HAVING RING LIGHT MODULE

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 122 days.

(21) Appl. No.: 12/857,125

(22) Filed: Aug. 16, 2010

(65) Prior Publication Data
US 2012/0039593 A1   Feb. 16, 2012

(51) Int. Cl.
*G03B 15/06* (2006.01)
(52) U.S. Cl. .......................... 396/175; 396/199
(58) Field of Classification Search .................. 396/175, 396/199
See application file for complete search history.

(56) References Cited

U.S. PATENT DOCUMENTS

| | | | |
|---|---|---|---|
| 4,068,245 A * | 1/1978 | Ohtaki et al. | 396/62 |
| 6,554,452 B1 * | 4/2003 | Bourn et al. | 362/247 |
| 7,382,976 B1 * | 6/2008 | Mok et al. | 396/62 |
| 2007/0110426 A1 * | 5/2007 | Tokiwa et al. | 396/155 |

* cited by examiner

*Primary Examiner* — Clayton E Laballe
*Assistant Examiner* — Dennis Hancock
(74) *Attorney, Agent, or Firm* — Chun-Ming Shih; HDLS IPR Services

(57) ABSTRACT

A photographic apparatus having ring light module includes a camera, a support base and a plurality of light units. The camera has a lens having an optical axis. The support base is connected to the camera and surrounds the lens. The support base includes an outer peripheral wall, an inner peripheral wall, and a bottom wall connected the outer peripheral wall and the inner peripheral wall. The bottom wall and the outer peripheral wall and the inner peripheral wall cooperatively define an accommodating groove. The angle between the bottom wall and the inner peripheral wall is an acute angle. The light units are arranged in the accommodating groove and fixed on the bottom wall and emit light beams in an oblique direction with respect to the optical axis.

6 Claims, 8 Drawing Sheets

PHOTOGRAPHIC APPARATUS HAVING RING LIGHT MODULE

BACKGROUND OF THE INVENTION

1. Field of the Invention

The present invention relates to a lighting apparatus, particularly relates to photographic apparatus having ring light module for photography.

2. Description of Related Art

Macro photography (or close-up photography) is to capture images of objects by photographic devices like cameras at a distance within about 30 cm. In recent years, applications of macro photography extend from ecological photography of animals and plants to high-magnification visual inspection and non-destructive inspection required in manufacturing processes of industrial products.

In the field of macro photography, the requirement of the illumination for objects is more important in comparison with normal photography. Since conventional ring-shaped flashlights installed on the lenses can not provide steady illumination, but can only provide instant flash illumination on the objects at the moment of shooting images, users can not predict if there will be enough illumination on the object before shooting. Therefore, users have to adjust the aperture and shutter speed of cameras in advance only based on their own experience, which leads to a higher failure rate of shooting.

Recently, many ring-shaped lights adopt cold cathode fluorescent lamps (CCFLs) or light emitting diodes (LEDs) as their light sources, which can provide steady illumination on objects for users to observe before shooting images. However, since the objects are very close to the ring-shaped light in macro photographing, the light projected by the ring-shaped light will cause a non-uniform brightness distribution with a darker center portion and a brighter outer portion.

SUMMARY OF THE INVENTION

The object of the present invention is to provide a photographic apparatus having ring light module, capable of providing uniform illumination to object for shooting.

Accordingly, the present provides a photographic apparatus having ring light module, which includes a camera, a support base and a plurality of light units. The camera has a lens having an optical axis. The support base is connected to the camera and surrounds the lens. The support base includes an outer peripheral wall, an inner peripheral wall, and a bottom wall connected the outer peripheral wall and the inner peripheral wall. The bottom wall and the outer peripheral wall and the inner peripheral wall cooperatively define an accommodating groove. The angle between the bottom wall and the inner peripheral wall is an acute angle. The light units are arranged in the accommodating groove and fixed on the bottom wall and emit light beams in an oblique direction with respect to the optical axis.

Besides, the present provides another photographic apparatus having ring light module, which includes a camera, a support base, a plurality of variable light units and a drive mechanism. The camera has a lens having an optical axis. The support base is connected to the camera and includes a tubular portion surrounding the lens, and an extension portion radially extending from the tubular portion. The variable light units are arranged on the extension portion of the support base and are able to be driven to change the direction of light projected therefrom. The drive mechanism is used to drive the variable light units to change the directions of light beams projected from the variable light units.

DETAILED DESCRIPTION OF THE INVENTION

The technical characteristics and contents of the present invention will become apparent with the following detailed description accompanied with related drawings.

Figure 1:
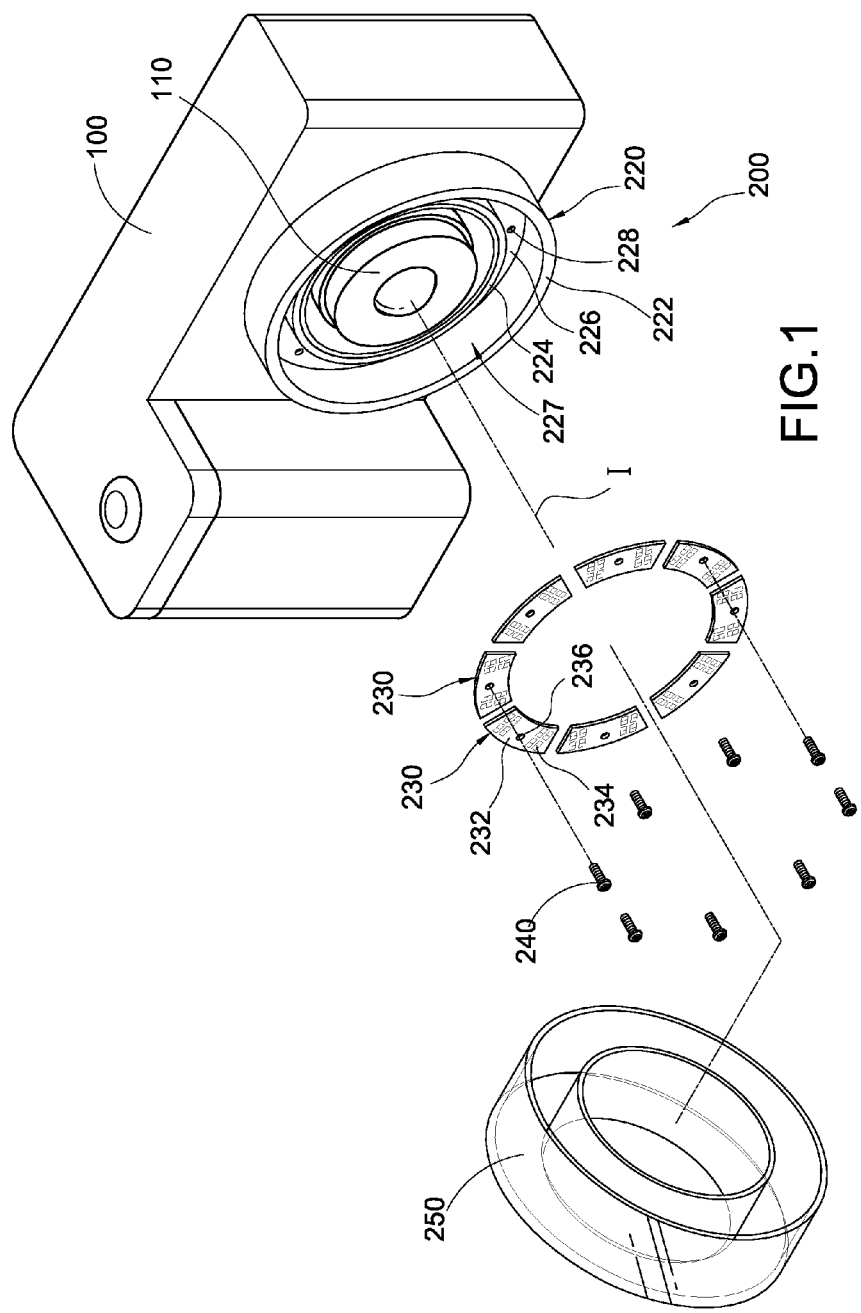
FIG. 1 is an exploded view of a photographic apparatus having ring light module according to the first embodiment of the present invention.
Figure 2:
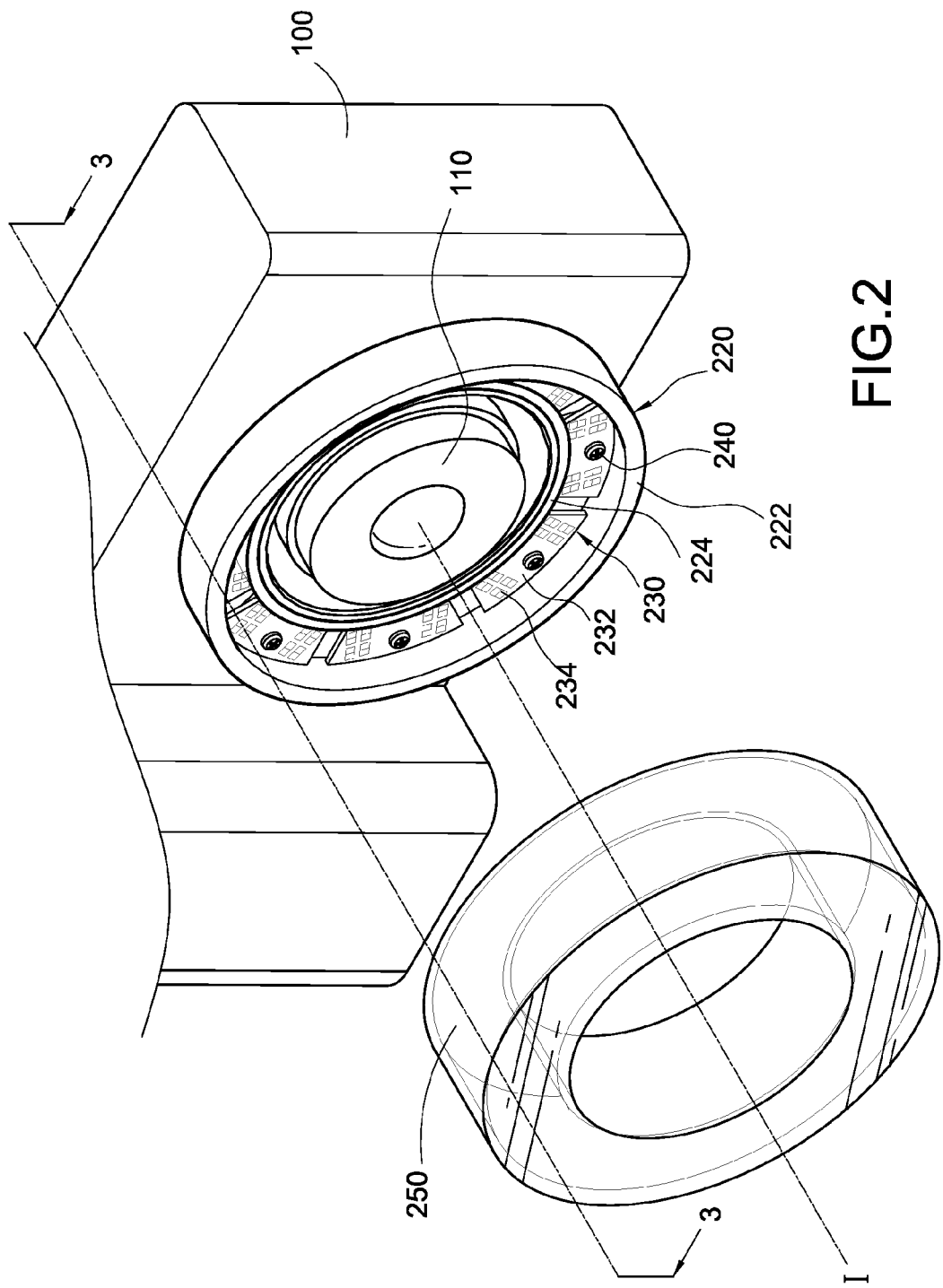
FIG. 2 is a perspective view of the photographic apparatus having ring light module.

FIG. 1 and FIG. 2 are respectively an exploded view and a schematic view of a photographic apparatus having ring light module according to the first embodiment of the present invention. The photographic apparatus having ring light module includes a camera 100, and a ring light module 200 arranged on the camera 100. The ring light module 200 is used for projecting light to an object for shooting. The camera 100 has a lens 110. The lens 110 has an optical axis I. The ring light module 200 has a support base 220 and a plurality of light units 230 installed on the support base 220.

The suppose base 220 is of ring-shape and connected to the camera 100 and surrounding the lens 110. The support base 220 has an outer peripheral wall 222, an inner peripheral wall 224, and a bottom wall 226 connected the outer peripheral wall 222 and the inner peripheral wall 224. The bottom wall 226, the outer peripheral wall 222 and the inner peripheral wall 224 cooperatively define a ring-shaped accommodating groove 227 for accommodating the light units 230. The bottom wall 226 is formed with a plurality of screw holes 228. The screw holes 228 can be inserted with screws 240 to fix the light units 230 to the bottom wall 226.

Each of the light units 230 is disposed in the accommodating groove 227 and can emit light independently under appropriate control. Each of the light units 230 includes a circuit board 232, and a plurality of light emitting diodes 234 arranged on the circuit board 232. Each of the circuit boards 232 has a through hole 236 thereon for passing a screw 240. The light emitting diodes 234 can be a LED capable of emitting white light which is formed by mixing of red, green and blue light components. In practical use, LED having other kinds of light can be adopted as needed.

In addition, a ring-shaped transparent cover 250 is provided and arranged on the light units 230 for protection. In another aspect, various pigments can be added in the transparent cover 250 to change the color of the light transmitted therethrough.

Figure 3:
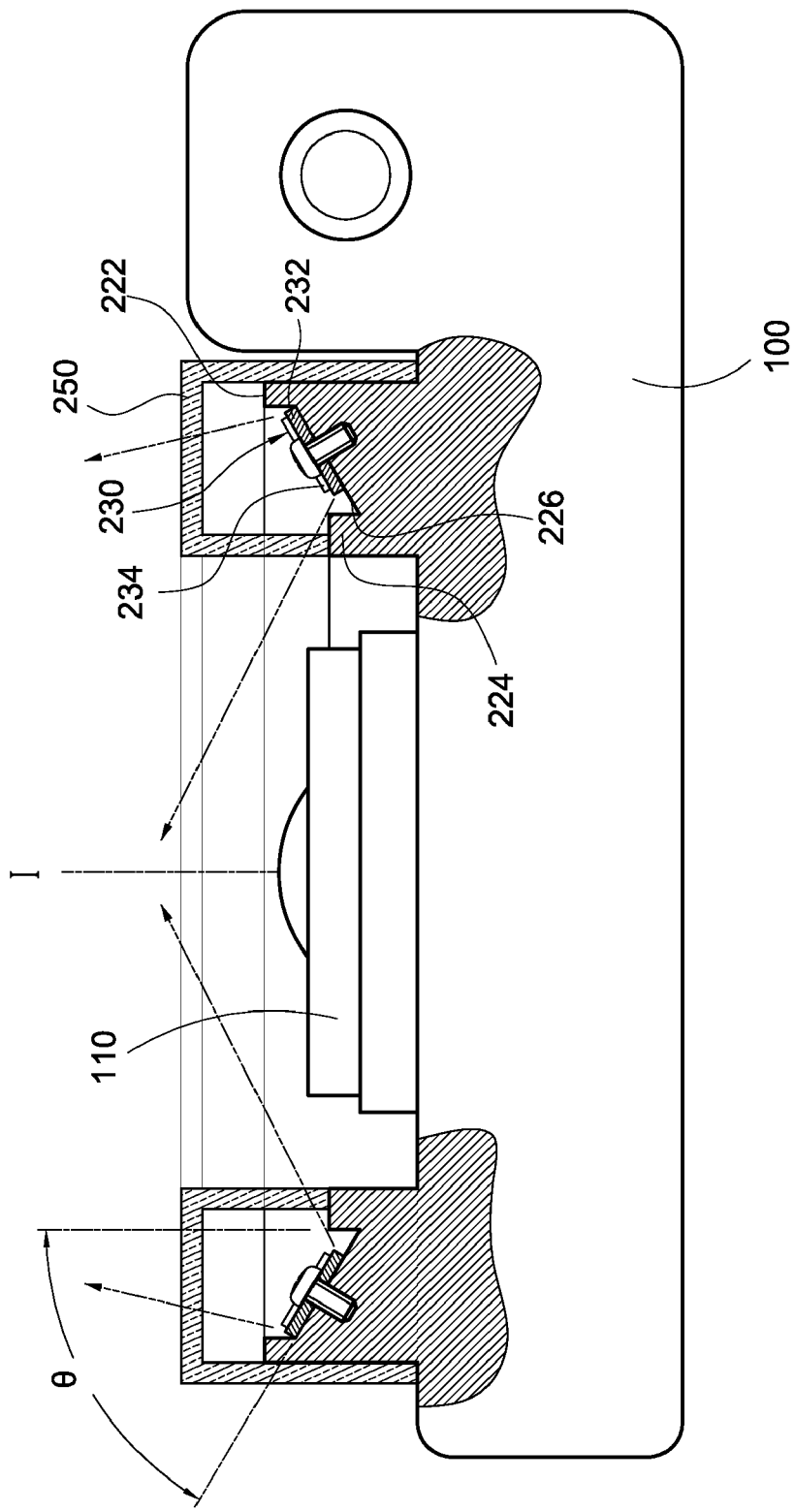
FIG. 3 is a cross-sectional view of the photographic apparatus having ring light module.

With reference to FIG. 3, the cross-sectional view of the photographic apparatus having ring light module shows that the angle between the bottom wall 226 and the inner peripheral wall 224 is an acute angle, which is larger than 0 degree and less than 90 degree. As such, the light units 230 emit light beams in an oblique direction with respect to the optical axis I. Therefore, for practical use in macro photography, the light beams will no longer cause the non-uniform brightness distribution with a darker center portion and a brighter outer portion.

Figure 4:
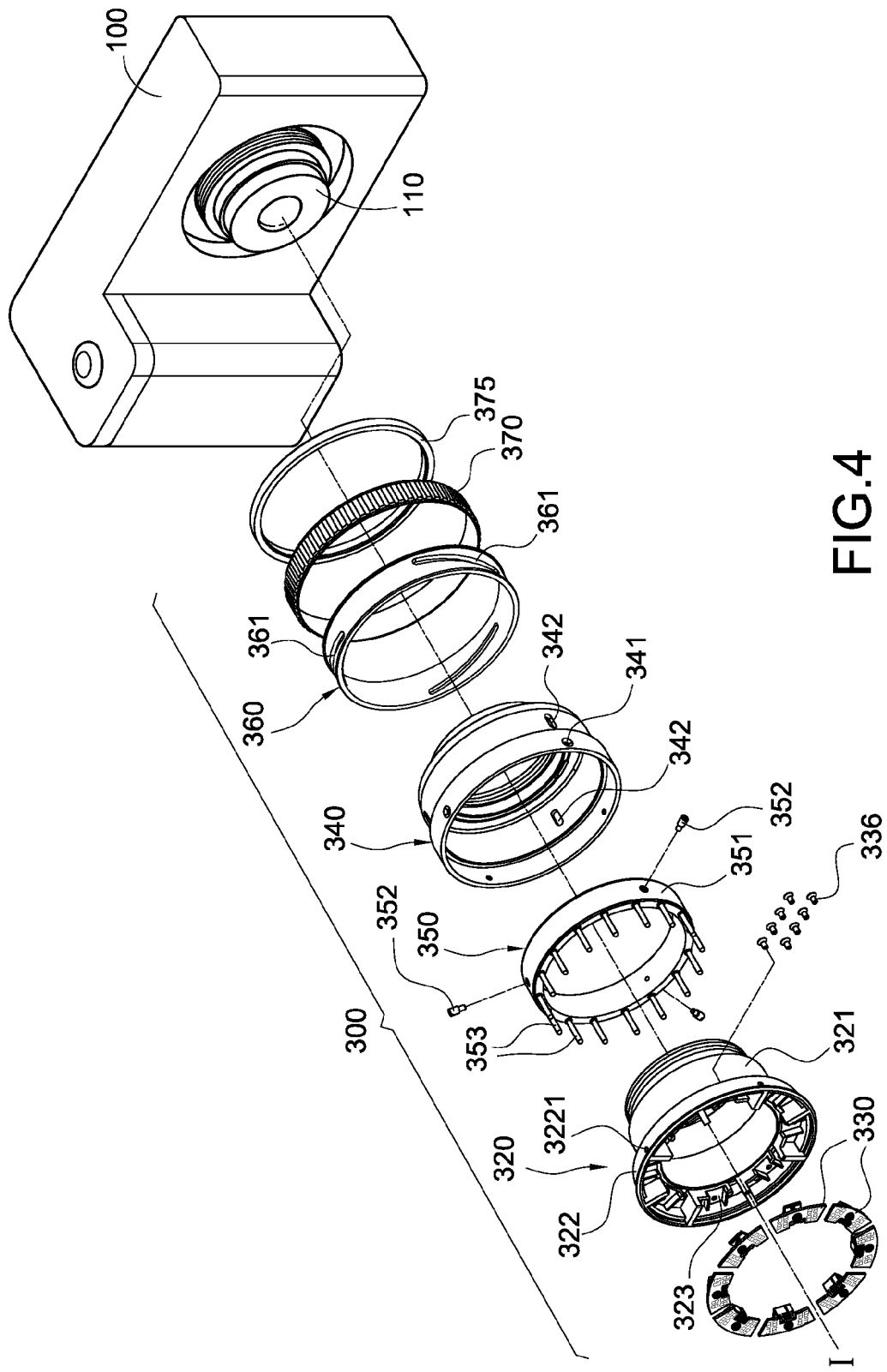
FIG. 4 is a perspective view of a photographic apparatus having ring light module according to the second embodiment of the present invention.
Figure 5:
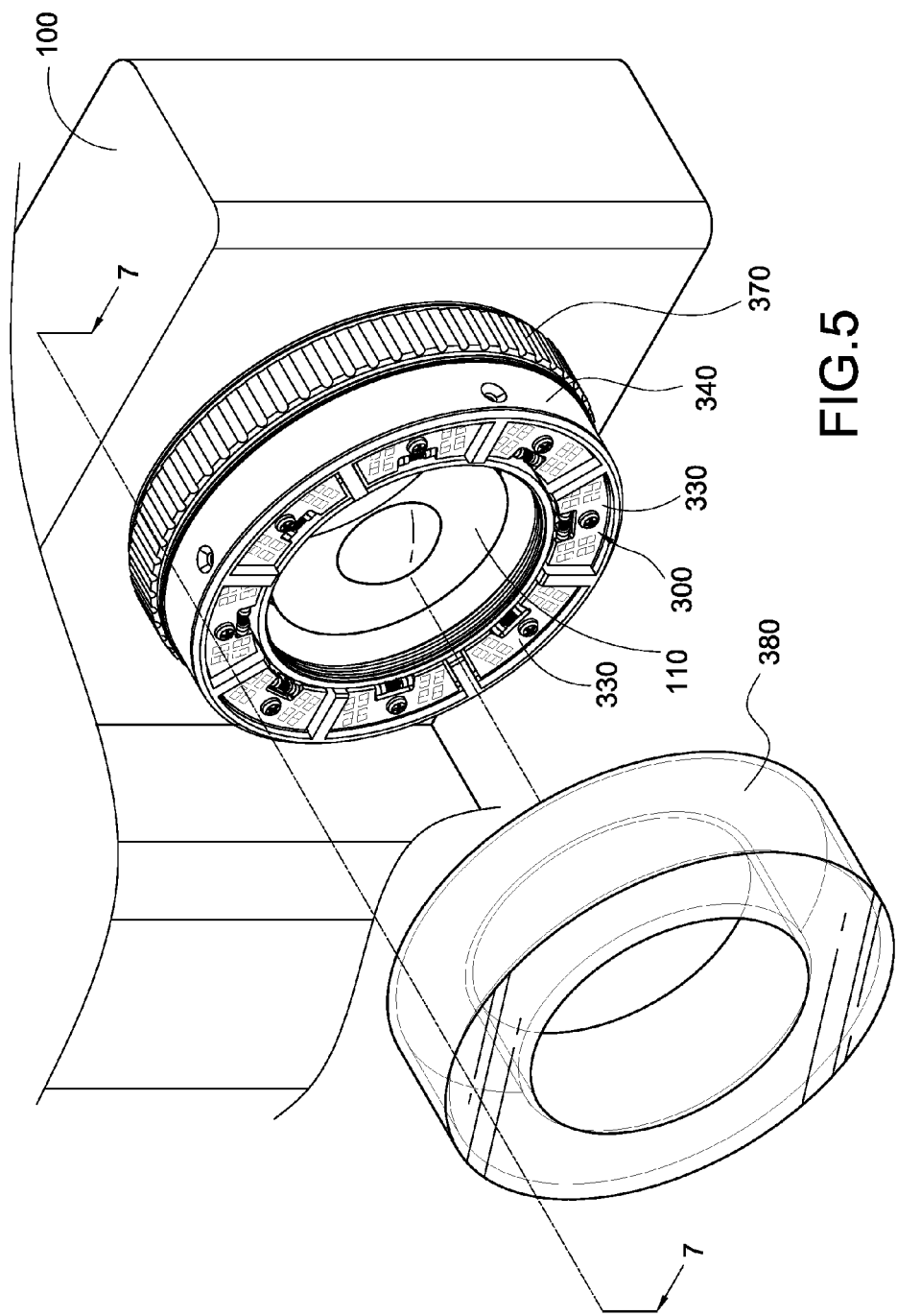
FIG. 5 is an exploded view of a photographic apparatus having ring light module.

FIG. 4 and FIG. 5 show a photographic apparatus having ring light module according to second embodiment of the present invention. The photographic apparatus having ring light module includes a camera 100, and a ring light module 300 arranged on the camera 100. The ring light module 300 is used for projecting light to an object. The camera 100 has a lens 110. The lens 110 has an optical axis I. The ring light module 300 has a support base 320, a plurality of variable light units 330 installed on the support base 320 and a drive mechanism used to drive the variable light units 330 to change the direction of light projected therefrom. The drive mechanism mainly includes a barrel 340 arranged around the support base 320, a pushing ring 350 arranged between the support base 320 and the barrel 340 and a rotary ring 360 arranged around the barrel 340.

The support base 320 is connected to the camera 100 and surrounds the lens 110. The support base 320 is substantially of tubular shape. The support base 320 mainly includes a tubular portion 321 around the lens 110, and an extension portion 322 radially extending from the tubular portion 321. The extension portion 322 has a plurality of mounting surfaces 323. The variable light units 330 are arranged on the mounting surfaces 323.

Figure 6:
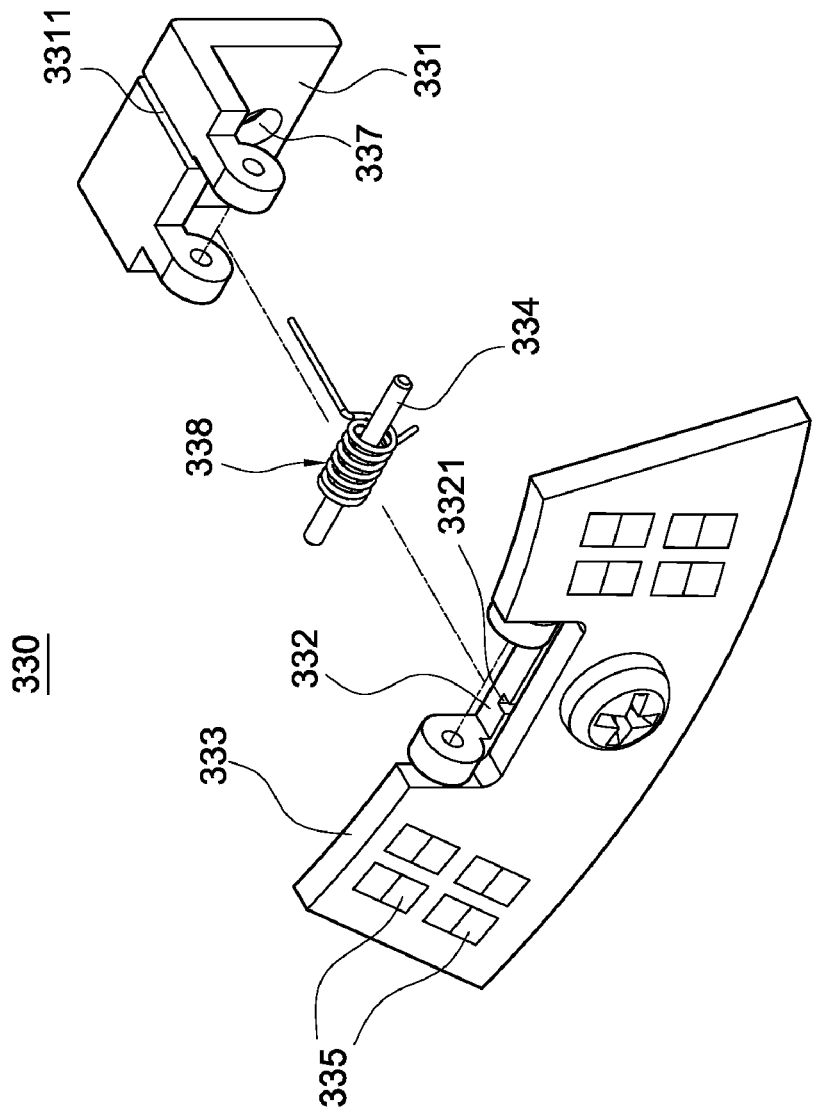
FIG. 6 is an exploded view of a variable light module of the photographic apparatus having ring light module.

As FIG. 4 and FIG. 6 show, the variable light units 330 can be driven to change the direction of light projected therefrom. Each of the variable light units 330 has a fixed member 331 disposed on the support base 320, a swing member 332 pivotally connected to the fixed member 331 by a pivot pin 334, a circuit board 333 disposed on the swing member 332, and a plurality of light emitting diodes 335 arranged on the circuit board 333.

By inserting screws 336 through the support 320 and the screw holes 337 of the fixed members 331, the fixed members 331 can be fixed on the support base 320. The light emitting diodes 335 can emit white light which consists of red, green and blue light components in order to achieve better color rendering effect. In practical use, the light emitting diodes 335 may have other colors of light as needed.

Besides, each of the variable light units 330 can emit light independently under appropriate control. In other words, users can selectively drive at least one of the variable light units 330 to project light according to practical demand. For example, three adjacent ones of the variable light units 330 can be chosen to project light to an object to form shadow as a special photographic effect.

While being driven by the drive mechanism, the circuit board 333 can swing outwardly toward the optical axis I, and the direction of light projected from the light units 330 can be changed. In addition, as FIG. 6 shows, each of the variable light units 330 has an elastic member 338 arranged around the pivot pin 334. In this embodiment, the elastic member 338 is a spring, which has an end rod against a recess 3311 of the fixing member 331 and another end rod against a recess 3321 of the swing member 332, thus forcing the swing member 332 inwardly toward the fixing member 331.

As FIG. 4 and FIG. 5 show, the barrel 340 is arranged around the support base 320. In this embodiment, the barrel 340 is fixed onto the support base 320 by inserting screws (not labeled) through the screw holes 341 of the barrel 340 and the screw holes 3221 of the support base 320. The barrel 340 has a plurality of sliding grooves 342 extending parallel to the optical axis I. In this embodiment, the number of the sliding grooves 342 is three and the number can be two or more in practical use.

The pushing ring 350 is arranged between the tubular portion 321 and the barrel 340 and is able to move along the direction of the optical axis I. The pushing ring 350 has a ring body 351 and a plurality of rods 353 extending from the ring body 351. The rods 353 correspondingly protrude through the extension portion 322 of the support base 320 and are against the circuit board 333. In addition, the pushing ring 350 further has a plurality of pins 352 radially connected to the ring body 351. The pins 352 correspondingly protrude through the sliding grooves 342 of the barrel 340.

The rotary ring 360 is arranged around the barrel 340 and has a plurality of oblique grooves 361, and each of the oblique grooves 361 is corresponding to the sliding grooves 342 and obliquely extends with respect to the sliding grooves 342. Through each of the oblique grooves 361, the pins 351 pass and protrude out from the corresponding sliding grooves 342.

In addition, the photographic apparatus having ring light module further includes a grip ring 370 firmly arranged around the rotary ring 360. The grip ring 370 is convenient for users to hold and rotate. Besides, a fixing ring 375 is provided to secure the rotary ring 360 from losing off from the barrel 340.

Figure 7:
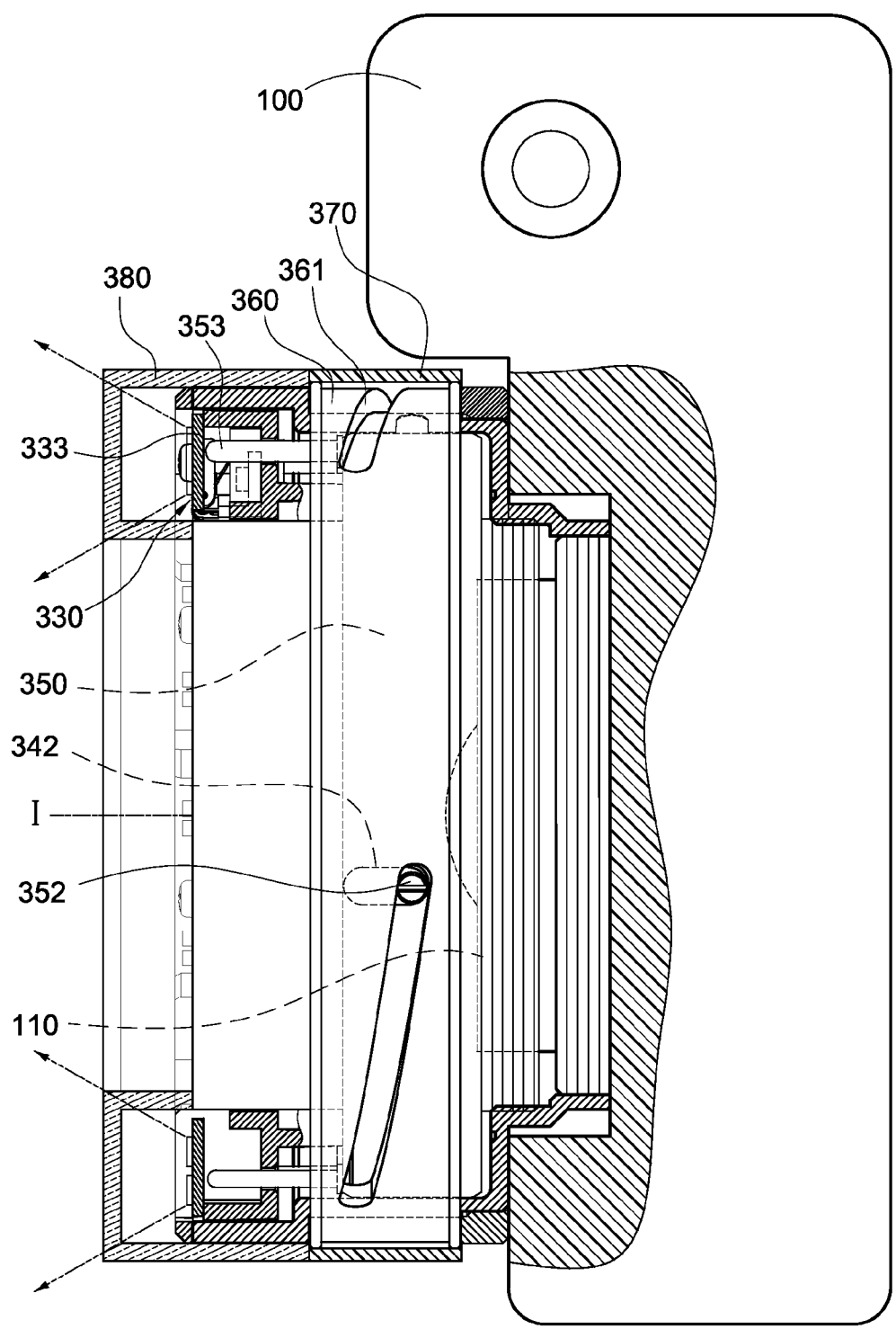
FIG. 7 and FIG. 8 are schematic views showing operating status of the photographic apparatus having ring light module.
Figure 8:
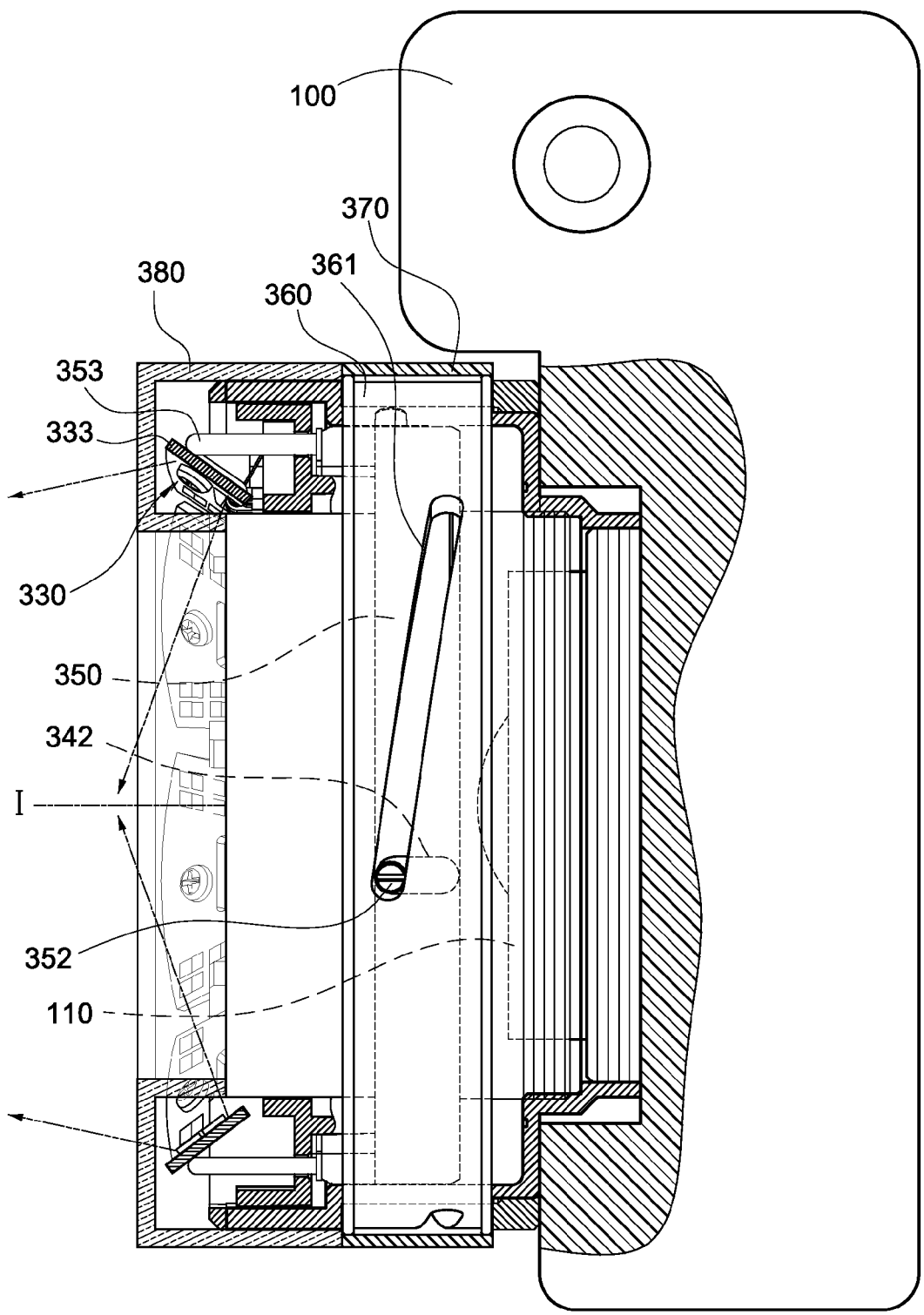

In practical operation, as FIG. 7 and FIG. 8 show, when the grip ring 370 is rotated about optical axis I, the rotary ring 360 is also rotated, and then the oblique grooves 361 on the rotary ring 360 can force the pins 352 to move along the sliding grooves 342, which extend parallel to the optical axis I. Thus, the rods 353 of the pushing ring 350 can push the circuit boards 333 of the variable light units 330 to swing outwardly toward the optical axis I, which makes the projecting direction of the light emitted from the variable light units 330 change. Specifically, the light beams emitted from the variable light units 330 converge toward the optical axis I. Therefore, the photographic apparatus having ring light module of the present invention can provide uniform illumination to the objects for shooting.

In addition, as FIG. 5 shows, a ring-shaped transparent cover 380 is further provided by this invention and arranged on the variable light units 330 for protection. In another aspect, various pigments can be added in the transparent cover 380 to change the colors of the light emitted from the light units 330.

Accordingly, by changing the projection direction of light beams of the variable light units 330, the photographic apparatus having ring light module of the present invention can provide uniform illumination according to the distance to the object for shooting, and avoid causing the non-uniform brightness distribution with a darker center portion and a brighter outer portion.

While the invention has been described by means of specific embodiments, numerous modifications and variations could be made thereto by those skilled in the art without departing from the scope and spirit of the invention set forth in the claims.

What is claimed is:

1. A photographic apparatus having ring light module, comprising:
   a camera having a lens, the lens having an optical axis;
   a support base connected to the camera and comprising a tubular portion surrounding the lens, and an extension portion radially extending from the tubular portion;
   a plurality of variable light units arranged on the extension portion of the support base and being able to be driven to change the direction of light projected therefrom, wherein each of the variable light units comprises a fixed member fixed on the support base, a swing member pivotally connected to the fixed member, a circuit board disposed on the swing member, and a plurality of light emitting diodes arranged on the circuit board; and a drive mechanism used to drive the variable light units to change the directions of light beams projected from the variable light units, wherein the drive mechanism further comprises:

a barrel arranged around the tubular portion of the support base, a pushing ring arranged between the tubular portion and the barrel and a rotary ring arranged around the barrel, wherein the barrel has a plurality of sliding grooves extending parallel to the optical axis, the pushing ring is able to move along the direction of the optical axis and has a ring body, a plurality of rods extending from the ring body and a plurality of pins radially connected to the ring body, the rods correspondingly protrude through the extension portion of the support base and are against the circuit boards, the pins correspondingly protrude through the sliding grooves of the barrel, the rotary ring has a plurality of oblique grooves corresponding to the sliding grooves, the oblique grooves obliquely extend with respect to the sliding grooves, through the oblique grooves the pins pass and protrude out from the sliding grooves, whereby when the rotary ring is rotated about the optical axis, the oblique grooves can force the pins to move along the sliding grooves, and the rods can push the circuit boards of the variable light units to swing outwardly to change the projecting direction of the light emitted from the variable light units.

2. The photographic apparatus having ring light module as claim 1, wherein the support base is tubular shaped.

3. The photographic apparatus having ring light module as claim 1, wherein each of the variable light units has an elastic member forcing the swing member to move inwardly.

4. The photographic apparatus having ring light module as claim 1, wherein the light emitting diodes are capable of emitting white light which is formed by mixing of red, green and blue light components.

5. The photographic apparatus having ring light module as claim 1, wherein each of the light units emits light independently.

6. The photographic apparatus having ring light module as claim 1, further comprising a ring-shaped transparent cover arranged on the light units.

* * * * *